(12) United States Patent
Trygubova (10) Patent No.: US 11,192,221 B2
(45) Date of Patent: Dec. 7, 2021

(54) CURVED-TIP SCREWDRIVER AND SCREWDRIVER BIT

(71) Applicant: DISH Network L.L.C., Englewood, CO (US)

(72) Inventor: Svitlana Trygubova, Lakewood, CO (US)

(73) Assignee: DISH Network L.L.C., Englewood, CO (US)

( * ) Notice: Subject to any disclaimer, the term of this patent is extended or adjusted under 35 U.S.C. 154(b) by 519 days.

(21) Appl. No.: 16/151,931

(22) Filed: Oct. 4, 2018

(65) Prior Publication Data

US 2020/0108489 A1   Apr. 9, 2020

(51) Int. Cl.
| B25B 15/00 | (2006.01) |
| B25B 23/00 | (2006.01) |
| F16B 23/00 | (2006.01) |
| B25B 21/00 | (2006.01) |

(52) U.S. Cl.
CPC ............ *B25B 15/004* (2013.01); *B25B 21/00* (2013.01); *B25B 23/0035* (2013.01); *F16B 23/0007* (2013.01)

(58) Field of Classification Search
CPC .......................... B25B 15/004; F16B 23/0007
See application file for complete search history.

(56) References Cited

U.S. PATENT DOCUMENTS

| RE6,730 E | 11/1875 | Cummings |
| 847,774 A | 3/1907 | Hoffman |
| 1,177,810 A | 4/1916 | Rogness |
| 1,978,781 A * | 10/1934 | Berger .................... E05C 19/10 |
| | | 70/89 |
| 2,015,878 A | 10/1935 | Trotter |
| 2,180,633 A | 11/1939 | Holt |
| 2,258,326 A | 10/1941 | Holt |
| 2,394,104 A * | 2/1946 | Rankin .................. F16B 39/28 |
| | | 411/301 |
| 2,418,960 A | 4/1947 | Todd |
| 2,684,094 A | 7/1954 | Lissy |
| 3,236,141 A | 2/1966 | Smith |
| 3,236,275 A | 2/1966 | Smith |
| 3,283,837 A | 11/1966 | McKain |
| 3,463,209 A | 8/1969 | Podolsky |
| 3,540,342 A | 11/1970 | Vaughn |
| 3,658,105 A | 4/1972 | Burt et al. |
| 3,726,330 A | 4/1973 | Adler |

(Continued)

OTHER PUBLICATIONS

Design U.S. Appl. No. 29/665,565, filed Oct. 4, 2018 Non Final Rejection dated Feb. 7, 2020, all pages.

(Continued)

*Primary Examiner* — Hadi Shakeri
(74) *Attorney, Agent, or Firm* — Kilpatrick Townsend & Stockton LLP (57) ABSTRACT

Various embodiments of a curved-tip screwdriver bit are presented. The bit may include a shank, a body connected with the shank, and a tip disposed at an end of the body. The tip may include curved blades that project from the end of the shaft. A first curved blade may have a first arc shaped cross section. A second curved blade may have a second arc shaped cross section. A radius of the second arc-shaped cross section may be greater than a radius of the first arc-shaped cross section of the first curved blade.

18 Claims, 8 Drawing Sheets

(56) References Cited

U.S. PATENT DOCUMENTS

| | | |
|---|---|---|
| 3,872,904 A | 3/1975 | Barlow |
| 4,037,514 A | 7/1977 | Lliteras |
| D264,552 S | 5/1982 | Bogren |
| 4,625,599 A * | 12/1986 | Icard .................... B25B 13/485 |
| | | 81/124.2 |
| D312,034 S | 11/1990 | Espin |
| D330,206 S | 10/1992 | Slutz |
| 5,353,667 A | 10/1994 | Wilner |
| 5,366,330 A | 11/1994 | Cosenza |
| 5,722,808 A | 3/1998 | Pritchard |
| 5,772,374 A | 6/1998 | Ide et al. |
| 5,779,410 A | 7/1998 | Lautenschlager et al. |
| D407,302 S * | 3/1999 | Lawson ........................ D8/387 |
| D423,901 S | 5/2000 | DePrisco |
| D453,289 S | 2/2002 | Campbell |
| 6,843,153 B1 | 1/2005 | Rawson-Harris |
| D506,922 S | 7/2005 | Simon |
| 7,013,767 B1 | 3/2006 | Seim |
| D807,139 S | 1/2018 | Riskin et al. |
| D843,826 S | 3/2019 | Tomei |
| 2001/0007629 A1 | 7/2001 | Carlo |
| 2004/0028499 A1 | 2/2004 | Levey et al. |
| 2004/0122442 A1 | 6/2004 | Lewis |
| 2007/0122250 A1 | 5/2007 | Mullner, Jr. |
| 2008/0219801 A1 | 9/2008 | Toenjes |
| 2009/0104002 A1 | 4/2009 | Dilling |
| 2009/0145270 A1 * | 6/2009 | Heesch ................ B25B 15/008 |
| | | 81/436 |
| 2009/0260489 A1 | 10/2009 | Siong |
| 2010/0104397 A1 | 4/2010 | Nojikawa |
| 2010/0196121 A1 | 8/2010 | Karupaya |
| 2012/0195710 A1 | 8/2012 | Shao |
| 2013/0089389 A1 | 4/2013 | Gong et al. |
| 2014/0086705 A1 | 3/2014 | Dawson et al. |
| 2015/0071732 A1 | 3/2015 | Hong |
| 2015/0125236 A1 | 5/2015 | Lin |
| 2018/0193986 A1 | 7/2018 | Tissieres |
| 2018/0320727 A1 | 11/2018 | Hsu |
| 2019/0063480 A1 | 2/2019 | Lajewardi et al. |
| 2020/0108489 A1 | 4/2020 | Trygubova |

OTHER PUBLICATIONS

Design U.S. Appl. No. 29/665,566, filed Oct. 4, 2018 Non Final Rejection dated Feb. 7, 2020, all pages.

* cited by examiner

CURVED-TIP SCREWDRIVER AND SCREWDRIVER BIT

BACKGROUND

Screwdrivers and screwdriver bits are commonly slot head or Phillips head. Ideally, a head of a bit may fit snuggly into a corresponding indentation in a screw or bolt, allow the screw or bolt to be turned, and minimize the amount of damage (e.g., stripping) to the screw or bolt. A slot head or Phillips head may not perform ideally in each of these performance areas.

SUMMARY

Various embodiments present a curved-tip driver bit that may be used as part of a screwdriver or as a removable bit in a manual or powered driver. An embodiment may include a shank, a body connected with the shank, and a tip disposed at an end of the body. The tip may include multiple curved blades that project from the end of the shaft. A first curved blade of the plurality of curved blades may have a first arc shaped cross section. A second curved blade of the plurality of curved blades may have a second arc shaped cross section. A radius of the second arc-shaped cross section may be greater than a radius of the first arc-shaped cross section of the first curved blade.

Embodiments of such a driver bit may include one or more of the following features: The tip may additionally comprises an extension that has a quarter-circle cross section. A radius of the first arc-shaped cross section may be greater than a radius of the quarter-circle cross section. The radius of the quarter-circle cross section, the radius of the first circular segment, and the radius of the second circular segment may share a common center. The first curved blade, the second curved blade, and the extension may each protrude from the shank by a common distance. A distance between the first curved blade and the second curved blade may match the distance between the extension and the first curved blade. Ends of the plurality of curved blades and the extension that are distal from the shank may each be tapered. The first curved blade may be longer than the second curved blade.

DETAILED DESCRIPTION OF THE INVENTION

A screwdriver bit, power driver bit, or screwdriver (collectively referred to as a "driver bit") may have multiple curved blades that allow the driver bit to be inserted into a corresponding fastener (e.g., screw, bolt) in a single, particular orientation. The curved blades may allow for a significant amount of torque to be applied to the fastener by the driver bit being rotated when inserted in the fastener. Further, in some embodiments, a quarter circle portion of the driver bit may further aid in increasing the amount of torque that can be applied by the driver bit and/or may help in alignment of the driver bit into the fastener's head.

Figure 1:
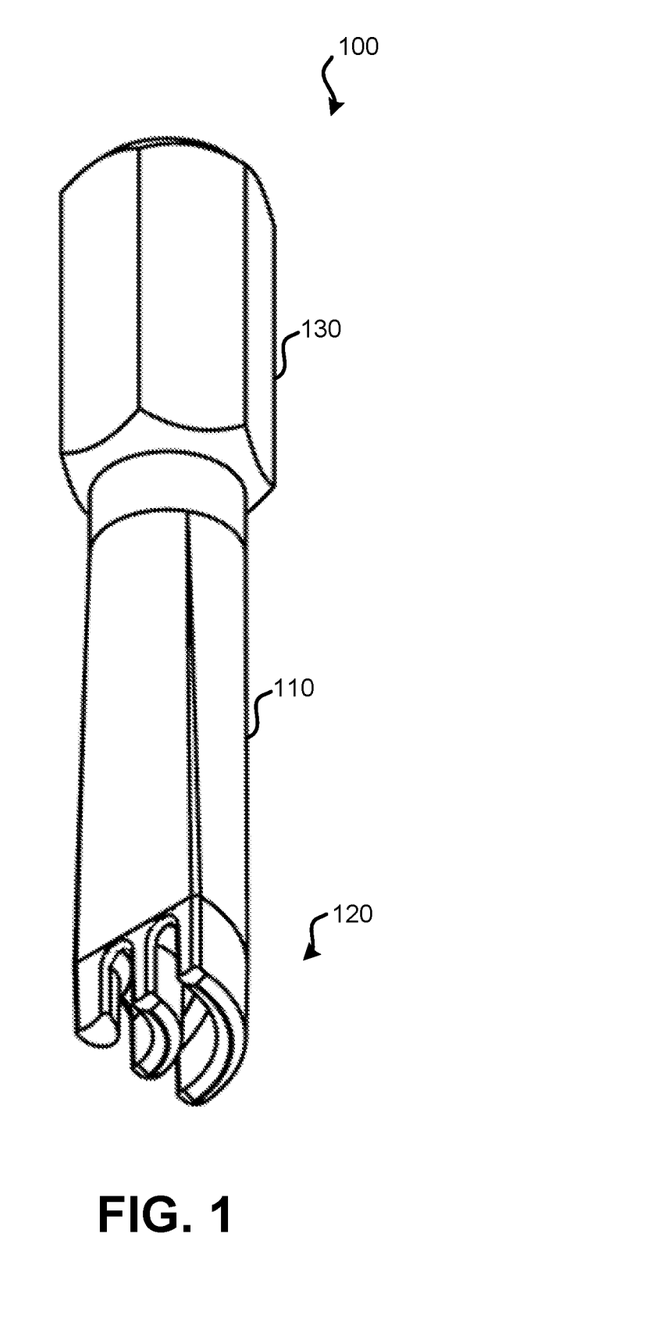
FIG. 1 illustrates an angled view of an embodiment of a driver bit.

FIG. 1 illustrates an angled view of an embodiment of a driver bit 100. Driver bit 100 may be installable in a screwdriver that allows for bits to be removably installed. Driver bit 100 may also be installable in a power driver, such as a corded or cordless drill. Driver bit 100 may include: body 110; tip 120; and shank 130. Shank 130 may be hexagonal and may allow for driver bit 100 to be removably coupled with a screwdriver, power driver, or some other mechanical device that receives driver bits and can rotate such driver bits to drive fasteners. Body 110 may serve to extend from shank 130 to tip 120. Body 110, tip 120, and shank 130 may be made from a rigid material, such as metal. In some embodiments, at least for tip 120, hardened metal is used to help reduce damage from repeated use; in some embodiments, body 110, tip 120; and shank 130 is hardened metal. Body 110 may have a cross-section that is a quarter circle where body 110 transitions into tip 120. Body 110 may have a circular cross-section where body 110 transitions into shank 130. The transition from a circular cross-section to a quarter-circle cross-section may occur gradually over the length of body 110. Further detail regarding tip 120 is provided in relation to FIG. 3, which is a more detailed view of tip 120.

Figure 2:
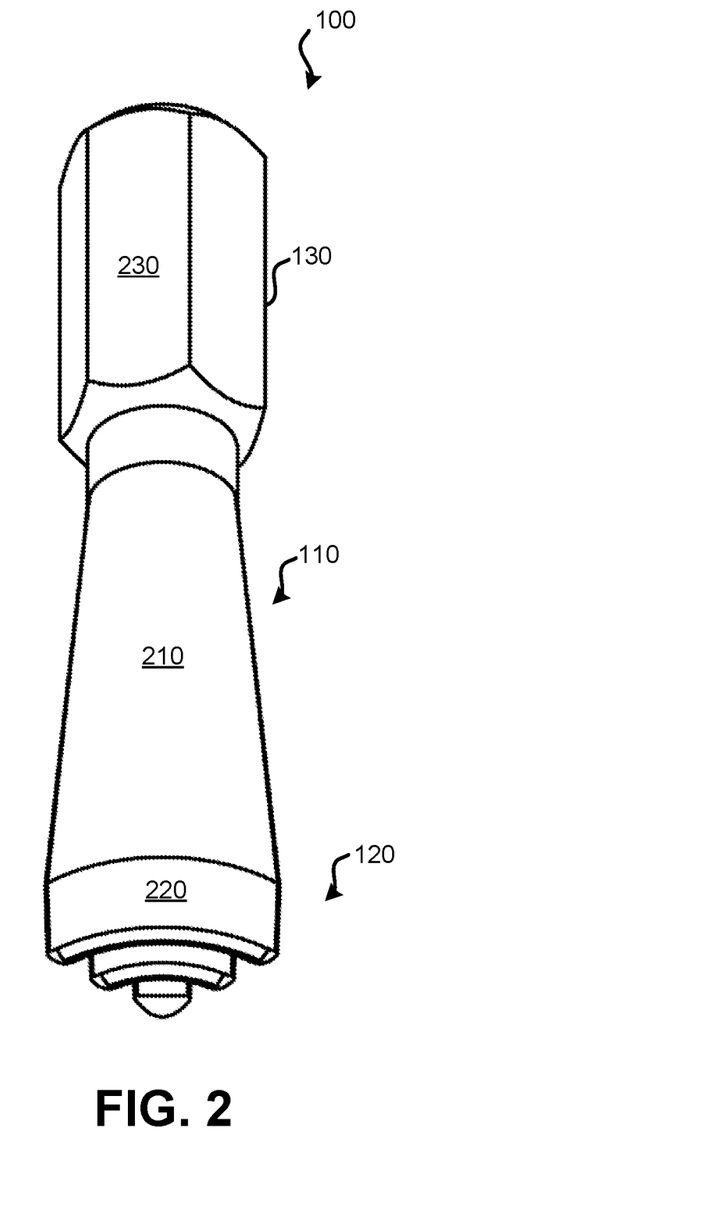
FIG. 2 illustrates another angled view of an embodiment of a driver bit.

FIG. 2 illustrates another angled view of an embodiment of driver bit 100. In the angled view of FIG. 2, surface 210 of body 110 is curved to transition from shank 130 to tip 120. Surface 220 of the largest blade transitions into surface 210 of body 110. Surface 220 may be parallel to surface 230 of shank 130.

Figure 3:
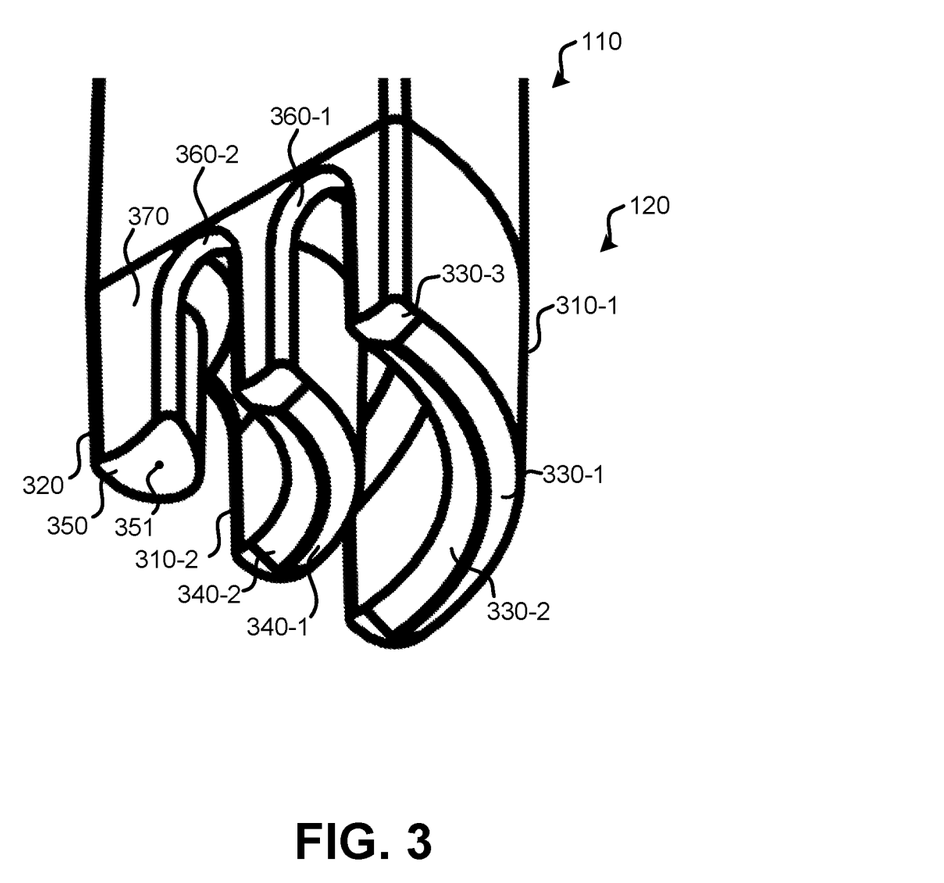
FIG. 3 illustrates a detailed view of a tip of a driver bit.

FIG. 3 illustrates a detailed view of a tip of a screwdriver bit. In the embodiment of FIG. 3, two blades are present: blade 310-1 and blade 310-2. In other embodiments, a greater number of blades may be present. Two blades has been found to be a beneficial arrangement because it allows for ample spacing between blades and for each blade to be thick enough for a significant amount of torque to be transferred to a fastener head. Each of curved blades 310 have a cross-section that is an arc. The arc of blade 310-1 and the arc of blade 310-2 may share a common center. The arc of blade 310-1 may have a greater radius than the arc of blade 310-2. The arc of blade 310-1 and the arc of blade 310-2 may each form a quarter-circle. In other embodiments, the arcs may each be greater or smaller than a quarter-circle. The thickness of each of curved blades 310 may be the same.

In some embodiments, one or more additional extensions are present. Extension 320 may extend away from body 110 a same distance as blade 310-1 and blade 310-2. In some embodiments, a cross-section of extension 320 is a quarter-circle shape. In other embodiments, the cross-section of extension 320 is greater or less than a quarter-circle. Extension 320 may have two flat sides (flat side 370 is visible in FIG. 3), which meets surfaces of body 110. A center of the quarter circle may be a same center as for the arcs of blades 310-1 and 310-2. Further, the radius of the quarter-circle is less than the radius of the arc of curved blade 310-2. The difference in radius between extension 320 and curved blade 310-2 may be the same as the difference in radius between curved blade 310-2 and curved blade 310-1.

In some embodiments, the ends of curved blades 310 and/or extension 320 may be tapered such that a center tapered region extends a greater distance away from body 110. Referring to blade 310-1, tapered region 330-1 may slope and meet tapered region 330-2. Similarly, referring to blade 310-2, tapered region 340-1 may slope and meet tapered region 340-2. Ends of curved blades 310 may also be tapered. For example, a first end of blade 310-1 has tapered region 330-3. In some embodiments, all ends of curved blades 310 are tapered. The tapered regions of the blades may match inversely tapered regions (that form troughs) in a fastener head, which may help tip 120 become seated within the fastener head. Additionally, such tapering may help tip 120 partially or fully cam out of a fastener head to prevent the fastener head from being damaged if excessive torque is applied to the fastener. Tapering may, alternatively or additionally, be present on extension 320. Tapering 350 may extend away from body 110 to point 351.

In some embodiments, other surfaces may be tapered. For example, in a region between curved blades 310, a tapered groove may be present. The edges of curved blades 310 and extension 320 may be tapered, as indicated by tapered regions 360-1 and 360-2.

In some embodiments, rather than tapering being present, radii may be used such that curved surfaces are present. For example, tapered regions 340-1 and 340-2 may be replaced with a curved surface having a radius.

Figure 4:
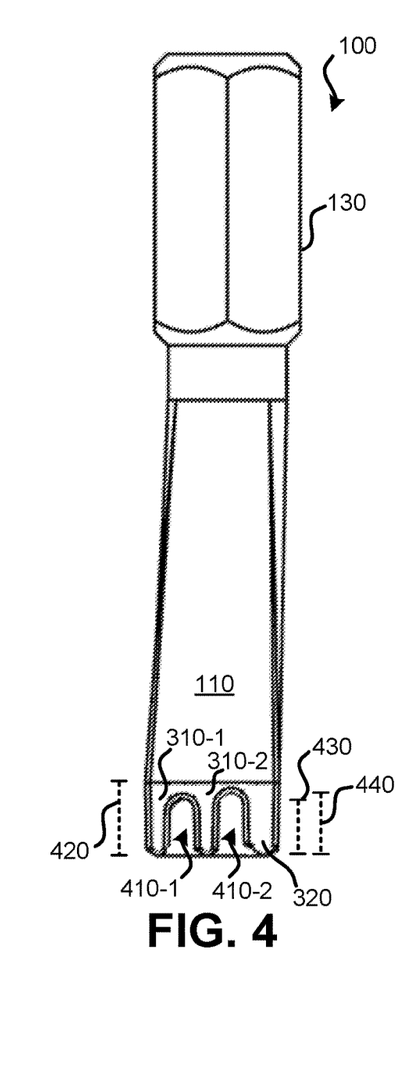
FIG. 4 illustrates a first side view of an embodiment of a driver bit.
Figure 5:
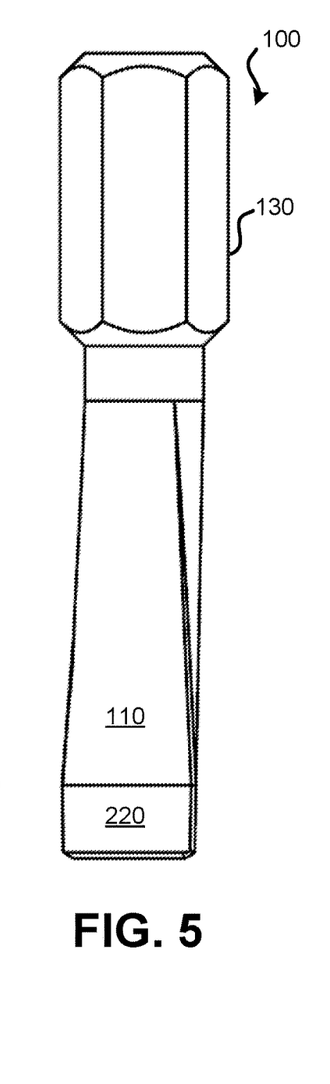
FIG. 5 illustrates a second side view of an embodiment of a driver bit.
Figure 6:
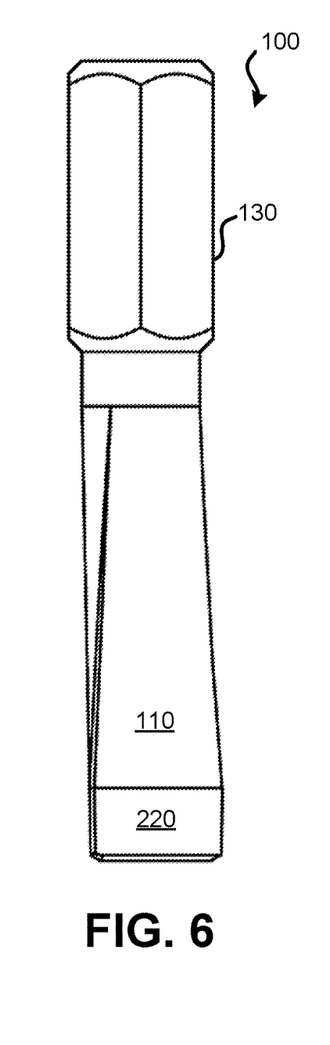
FIG. 6 illustrates a third side view of an embodiment of a driver bit.
Figure 7:
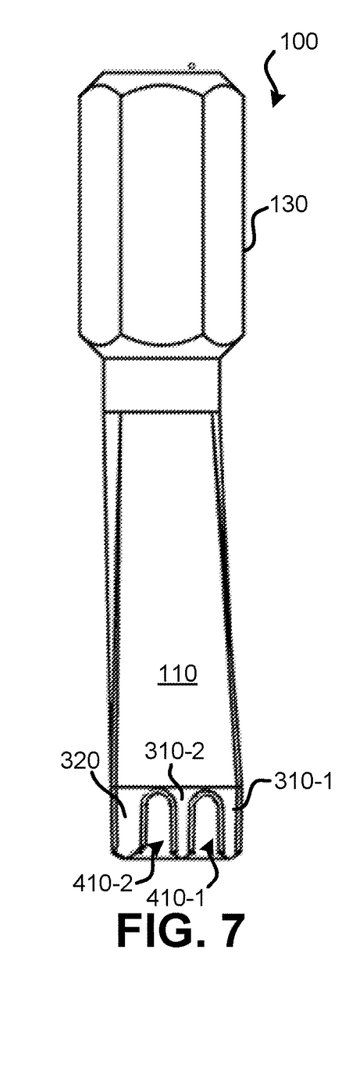
FIG. 7 illustrates a fourth side view of an embodiment of a driver bit.

FIG. 4 illustrates a first side view of an embodiment of driver bit 100. FIG. 5 illustrates a second side view of an embodiment of driver bit 100. FIG. 6 illustrates a third side view of an embodiment of driver bit 100. FIG. 7 illustrates a fourth side view of an embodiment of driver bit 100. In FIG. 4, channels 410 are visible. Channel 410-1 is an open region between blade 310-1 and blade 310-2. Channel 410-2 is between blade 310-2 and extension 320. Channels 410 may have different depths. That is, distance 430, which represents the depth of channel 410-1 may be different than distance 440, which represents the depth of channel 410-2. Extension 320, blade 310-1 and blade 310-2 may extend a same distance 420 away from body 110. In some embodiments, blade 310-2 may extend a greatest distance and extension 320 and blade 310-1 may be shorter in length.

Figure 8:
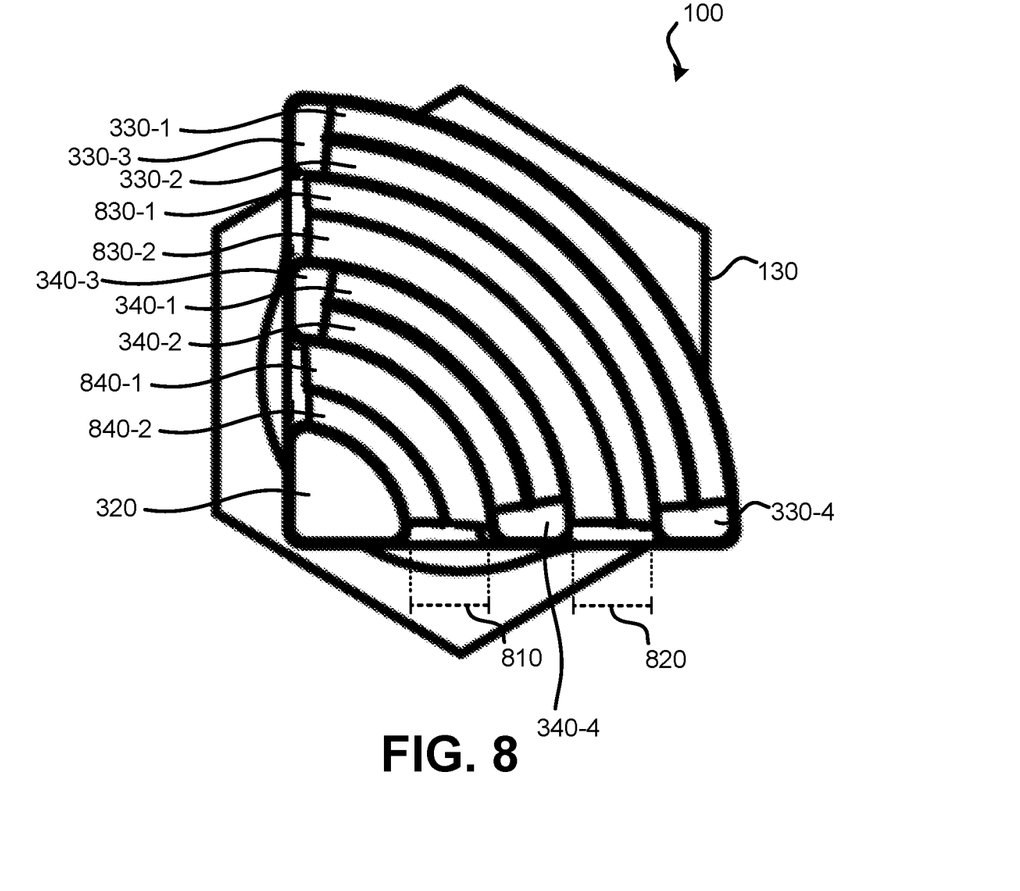
FIG. 8 illustrates an end view of an embodiment of a tip of a driver bit.

FIG. 8 illustrates an end view of an embodiment of a tip of driver bit 100. Tapered regions 330 (330-1, 330-2, 330-3, and 330-4) and 340 (340-1, 340-2, 340-3, and 340-4) are visible in FIG. 8. Distance 810 (the distance between extension 320 and curved blade 310-2 across channel 410-2) may be the same as distance 820 (the distance between curved blade 310-2 and curved blade 310-1 across channel 410-1). In other embodiments, distance 810 may be greater or smaller than distance 820. Also visible in FIG. 8 are tapered regions 830-1 and 830-2. These tapered regions may reside within channel 410-1. Tapered region 830-1 and tapered region 830-2 meet to form a concave cavity within channel 410-1. That is, while tapered regions 330 and 340 form convex extensions from curved blades 310, tapered regions 830 are tapered in the opposite direction to move a concave cavity. Tapered regions 840-1 and 840-2 may form a similar concave cavity in channel 410-2 between extension 320 and curved blade 310-2.

Figure 9:
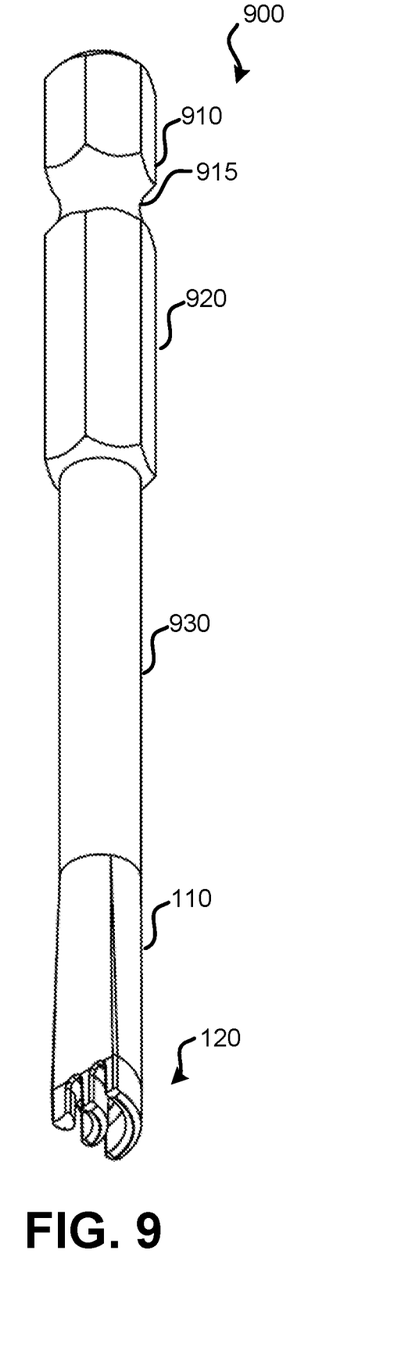
FIG. 9 illustrates an angled view of an embodiment of a power driver bit.

FIG. 9 illustrates an angled view of an embodiment of a power driver bit 900. Power driver bit 900 may be removably attached to a power driver, such as a cordless or corded drill. Power driver bit 900 may include: body 110; tip 120; shank 910; power groove 915; shank extension 920; and body extension 930. The entirety of power driver bit 900 may be made from metal. Tip 120 and possibly some or all of the remaining parts of power driver bit 900 may be formed using hardened metal. Body extension 930 may attach body 110 with shank extension 920. Shank extension may be attached with shank 910 via power groove 915. Power groove 915 may be designed to engage with metal balls in a quick-release chuck of a power driver. Body, tip 120, and shank 910 may function as detailed in relation to FIGS. 1-8.

Figure 10:
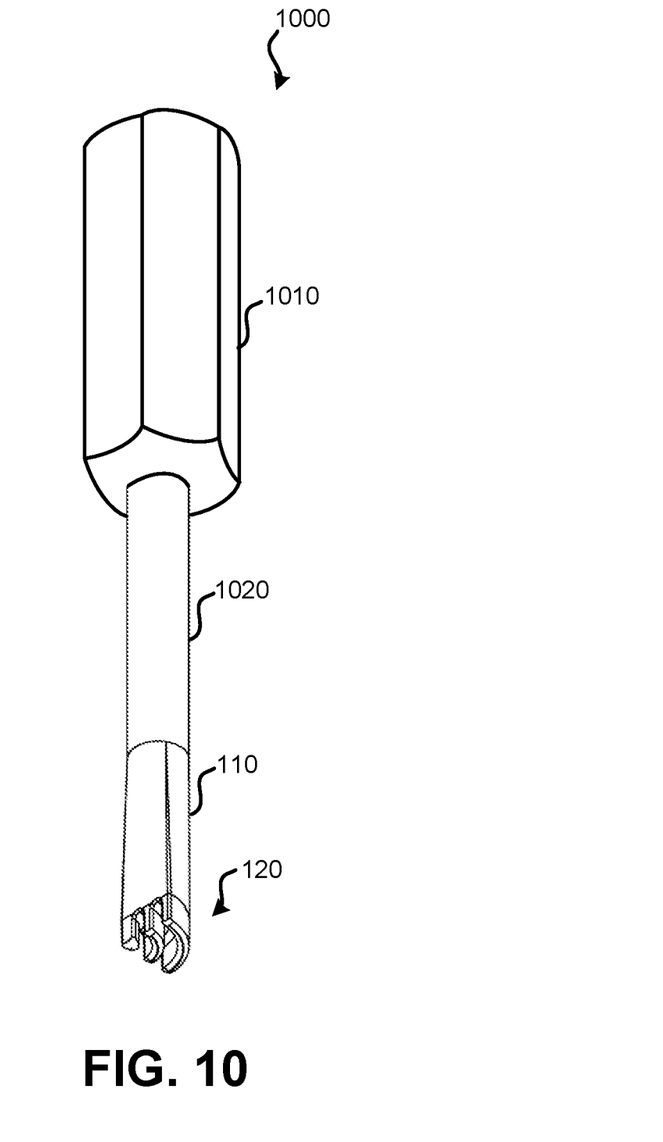
FIG. 10 illustrates an angled view of an embodiment of a screwdriver.

FIG. 10 illustrates an angled view of an embodiment of a screwdriver 1000. Screwdriver 1000 may include: handle 1010; body extension 1020; body 110; and tip 120. Tip 120 and body 110 may function as detailed in relation to FIGS. 1-8. Body extension 930 may connect body 110 to handle 1010. Handle 1010 may allow a user to manually rotate tip 120. Body 110, body extension 1020, and tip 120 may be formed from metal. Handle 1010 may be metal or another material, such as plastic or rubber.

Figure 11:
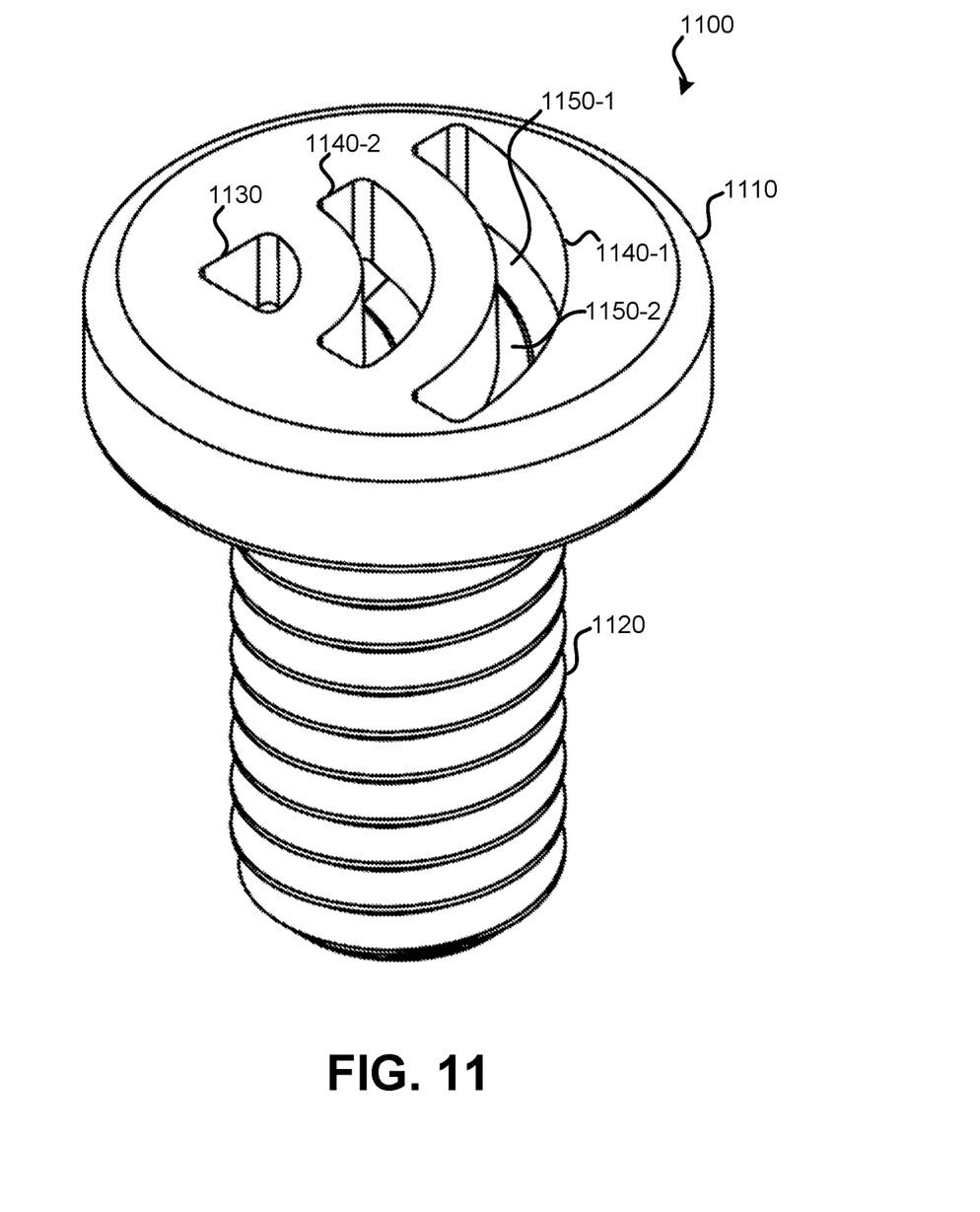
FIG. 11 illustrates an angled view of an embodiment of a fastener that can be rotated using the detailed screwdriver bits, power driver bit, and screwdriver.

FIG. 11 illustrates an angled view of an embodiment of a fastener 1100 that can be rotated using the detailed screwdriver bits, power driver bit, and screwdriver. Fastener 1100 may be made from metal, nylon, plastic, or some other rigid or semi-rigid material. Embodiments of fastener 1100 can include screws and bolts. Fastener 1100 may include: fastener head 1110; and threaded body 1120. On fastener head 1110, two or more cavities may be present. In FIG. 11, cavity 1130 in fastener head 1110 is shaped to receive an extension having a quarter-circle cross-section (e.g., extension 320). Cavity 1140-1 is curved in an arc to receive curved blade 310-1. Cavity 1140-2 is curved in an arc to receive curved blade 310-2. The depth of cavity 1130 may match distance 440. The depth of cavities 1140-1 and 1140-2 may match distance 430. Present within cavities 1130 and 1140 may be tapered bottoms. Tapered bottoms may form a trough to receive tapered regions 330, 340, and 350 of tip 120. In cavity 1140-1, tapered region 1150-1 meets with tapered region 1150-2 of fastener head 1110 to move a concave depression. Similar concave depressions may be present within cavity 1140-2 and 1130.

The devices discussed above are examples. Various configurations may omit, substitute, or add various procedures or components as appropriate. Features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). The preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger device or system.

What is claimed is:

1. A curved-tip screwdriver bit, comprising:
   a shank;
   a body connected with the shank; and
   a tip disposed at an end of the body, wherein:
   the tip comprises a plurality of curved blades that project from the end of the body and an extension that has a quarter-circle cross section;
   a first curved blade of the plurality of curved blades has a first arc-shaped cross section;
   a second curved blade of the plurality of curved blades has a second arc-shaped cross section;
   and
   a radius of the second arc-shaped cross section is greater than a radius of the first arc-shaped cross section of the first curved blade.

2. The curved-tip screwdriver bit of claim 1, wherein a radius of the first arc-shaped cross section is greater than a radius of the quarter-circle cross section.

3. The curved-tip screwdriver bit of claim 2, the radius of the quarter-circle cross section, the radius of the first arc-shaped cross section, and the radius of the second arc-shaped cross section share a common center.

4. The curved-tip screwdriver bit of claim 3, wherein the first curved blade, the second curved blade, and the extension each protrude from the shank by a common distance.

5. The curved-tip screwdriver bit of claim 4, wherein a distance between the first curved blade and the second curved blade matches the distance between the extension and the first curved blade.

6. The curved-tip screwdriver bit of claim 5, wherein ends of the plurality of curved blades and the extension that are distal from the shank are each tapered.

7. The curved-tip screwdriver bit of claim 1, wherein the first curved blade is longer than the second curved blade.

8. A curved-tip screwdriver, comprising:
   a handle;
   a body, having a first end attached to the handle and a second end; and
   a tip disposed at the second end of the body, wherein:
   the tip comprises a plurality of curved blades that project from the second end of the body;
   a first curved blade of the plurality of curved blades has a first arc-shaped cross section;
   a second curved blade of the plurality of curved blades has a second arc-shaped cross section;
   the tip additionally comprises an extension that has a quarter-circle cross section; and
   a radius of the second arc-shaped cross section is greater than a radius of the first arc-shaped cross section of the first curved blade.

9. The curved-tip screwdriver of claim 8, wherein a radius of the first arc-shaped cross section is greater than a radius of the quarter-circle cross section.

10. The curved-tip screwdriver of claim 9, the radius of the quarter-circle cross section, the radius of the first arc-shaped cross section, and the radius of the second arc-shaped cross section share a common center.

11. The curved-tip screwdriver of claim 10, wherein the first curved blade, the second curved blade, and the extension each protrude from the body by a common distance.

12. The curved-tip screwdriver of claim 11, wherein a distance between the first curved blade and the second curved blade matches the distance between the extension and the first curved blade.

13. The curved-tip screwdriver of claim 12, wherein ends of the plurality of curved blades and the extension that are distal from the body are each tapered.

14. The curved-tip screwdriver of claim 8, wherein the first curved blade is longer than the second curved blade and the extension.

15. A curved-tip screwdriver bit, comprising:
    a body; and
    a tip disposed at an end of the body, wherein:
    the tip comprises a plurality of curved blades that project from the end of the body;
    a first curved blade of the plurality of curved blades has a first arc-shaped cross section;
    a second curved blade of the plurality of curved blades has a second arc-shaped cross section;
    the tip additionally comprises an extension that has a quarter-circle cross section; and
    a radius of the second arc-shaped cross section is greater than a radius of the first arc-shaped cross section of the first curved blade.

16. The curved-tip screwdriver bit of claim 15, wherein ends of the plurality of curved blades and the extension are each tapered.

17. The curved-tip screwdriver bit of claim 16, wherein the first curved blade is longer than the second curved blade.

18. The curved-tip screwdriver bit of claim 15, wherein a radius of the first arc-shaped cross section is greater than a radius of the quarter-circle cross section.

* * * * *